(12) United States Patent  
Nakao

(10) Patent No.: US 11,955,812 B2  
(45) Date of Patent: Apr. 9, 2024

(54) NON-CONTACT POWER FEEDING DEVICE

(71) Applicant: OMRON Corporation, Kyoto (JP)

(72) Inventor: Goro Nakao, Inazawa (JP)

(73) Assignee: OMRON CORPORATION, Kyoto (JP)

( * ) Notice: Subject to any disclaimer, the term of this patent is extended or adjusted under 35 U.S.C. 154(b) by 340 days.

(21) Appl. No.: 17/430,333

(22) PCT Filed: Mar. 6, 2020

(86) PCT No.: PCT/JP2020/009840  
§ 371 (c)(1),  
(2) Date: Aug. 12, 2021

(87) PCT Pub. No.: WO2020/189351  
PCT Pub. Date: Sep. 24, 2020

(65) Prior Publication Data  
US 2022/0131414 A1    Apr. 28, 2022

(30) Foreign Application Priority Data  
Mar. 20, 2019 (JP) ................ 2019-053039

(51) Int. Cl.  
*H02J 50/12* (2016.01)  
*H02J 50/00* (2016.01)  
*H02J 50/40* (2016.01)

(52) U.S. Cl.  
CPC ............ *H02J 50/12* (2016.02); *H02J 50/005* (2020.01); *H02J 50/402* (2020.01)

(58) Field of Classification Search  
CPC ......... H02J 50/12; H02J 50/005; H02J 50/402  
(Continued)

(56) References Cited

U.S. PATENT DOCUMENTS 9,088,307 B2 * 7/2015 Lisi .................. H02J 50/40  
10,879,736 B2 * 12/2020 Li ................... H02J 50/005  
(Continued)

FOREIGN PATENT DOCUMENTS

DE   102015118704 A1 * 6/2016 ............ H01F 38/14  
JP      2011087433 A  * 4/2011 ............ H01F 38/14  
(Continued)

OTHER PUBLICATIONS

DigiKey's North American Editors, "Inductive Versus Resonant Wireless Charging: A Truce May Be A Designer's Best Choice", https://www.digikey.com/en/articles/inductive-versus-resonant-wireless-charging, Aug. 2, 2016, 10 pages. (Year: 2016).*  
(Continued)

*Primary Examiner* — Phallaka Kik  
(74) *Attorney, Agent, or Firm* — METROLEX IP LAW GROUP, PLLC

(57) ABSTRACT

A power receiver device of a non-contact power feeding device includes a plurality of resonance circuits that receive power from a power transmitter device, and a power receiver circuit that outputs, to a load circuit, the power received from the power transmitter device by the plurality of resonance circuits. Each of the plurality of resonance circuits includes a receiver coil that receives power from a transmitter coil of the power transmitter device, and a resonance capacitor that resonates, together with the receiver coil, with AC power supplied to the transmitter coil of the power transmitter device. The receiver coils of the plurality of resonance circuits are arranged so as to be electromagnetically coupled to each other.

4 Claims, 7 Drawing Sheets

(58) Field of Classification Search
USPC .................. 320/108, 109, 110, 112, 115
See application file for complete search history.

(56) References Cited

U.S. PATENT DOCUMENTS

| | | | |
|---|---|---|---|
| 11,406,836 B1* | 8/2022 | O'Driscoll | H02J 50/12 |
| 2012/0043826 A1* | 2/2012 | Saitoh | H01F 38/14 |
| | | | 307/104 |
| 2012/0169136 A1* | 7/2012 | Lisi | H04B 5/0081 |
| | | | 307/104 |
| 2013/0234527 A1* | 9/2013 | Ishihara | H04B 5/0037 |
| | | | 307/104 |
| 2014/0292079 A1* | 10/2014 | Niizuma | H02J 50/12 |
| | | | 307/18 |
| 2016/0156231 A1* | 6/2016 | Shibuya | H02J 50/12 |
| | | | 455/82 |
| 2016/0294222 A1* | 10/2016 | Yuasa | B60L 53/12 |
| 2017/0133888 A1* | 5/2017 | Uchida | H02J 50/80 |
| 2017/0155286 A1* | 6/2017 | Kato | H02J 50/10 |
| 2017/0244282 A1* | 8/2017 | Zhang | H02J 50/12 |
| 2018/0183272 A1* | 6/2018 | Nakao | H02J 50/12 |
| 2018/0269718 A1* | 9/2018 | Li | H01F 38/14 |
| 2018/0309327 A1* | 10/2018 | Miyamoto | G01N 27/00 |
| 2019/0103768 A1* | 4/2019 | Uchida | H04B 5/0037 |
| 2020/0412172 A1* | 12/2020 | Nakao | H01F 38/14 |
| 2021/0013742 A1* | 1/2021 | Nakao | H02J 50/12 |
| 2021/0044151 A1* | 2/2021 | Nakao | H02J 50/80 |
| 2021/0066966 A1* | 3/2021 | Nomura | H02J 50/80 |

FOREIGN PATENT DOCUMENTS

| | | | | |
|---|---|---|---|---|
| JP | 2011-176914 A | | 9/2011 | |
| JP | 2012-196117 A | | 10/2012 | |
| JP | 2012196117 A | * | 10/2012 | |
| JP | 2016197957 A | * | 11/2016 | B60L 53/12 |
| JP | 2018038211 A | * | 3/2018 | |

OTHER PUBLICATIONS

English translation of the International Search Report ("ISR") of PCT/JP2020/009840 dated May 26, 2020.
Written Opinion("WO") of PCT/JP2020/009840 dated May 26, 2020.
Japanese Office Action dated Mar. 28, 2023 in a counterpart Japanese patent application.

* cited by examiner

NON-CONTACT POWER FEEDING DEVICE

TECHNICAL FIELD

The present disclosure relates to a non-contact power feeding device.

BACKGROUND ART

Research has been conducted on a so-called non-contact power feeding (also called wireless power transfer) technology of transmitting power across space without using metal contacts or the like.

In a power feeding device (hereinafter, simply referred to as a non-contact power feeding device) using the non-contact power feeding technology, a primary-side (power transmitter-side) coil (hereinafter, referred to as a transmitter coil or a primary coil) and a secondary-side (power receiver-side) coil (hereinafter, referred to as a receiver coil or a secondary coil) are electromagnetically coupled to allow power to be transmitted from a power transmitter-side device to a power receiver-side device via the two coils.

For such a non-contact power feeding technology, in order to reduce a burden of an insulation design, a technology for suppressing an increase in a voltage across terminals of a primary coil for use in supplying power to a secondary coil has been proposed (see, for example, Patent Document 1). Under this technology, the primary coil is divided into a plurality of primary partial coils, a series capacitor connected in series to the primary coil is divided into a plurality of series partial capacitors, and the primary partial coils and the series partial capacitors are alternately connected in series.

PRIOR ART DOCUMENT

Patent Document

Patent Document 1: Japanese Unexamined Patent Publication No. 2011-176914

SUMMARY

In a manner that depends on a degree of coupling between the power transmitter-side coil and the power receiver-side coil, a voltage applied to the power transmitter-side coil, and inductance of the power receiver-side coil and capacitance of a resonance capacitor, the resonance capacitor and the power receiver-side coil making up a resonance circuit, a voltage across terminals of the resonance capacitor may excessively increase. The technology disclosed in Patent Document 1, however, fail to make the voltage across the terminals of the resonance capacitor of the power receiver-side resonance circuit lower.

Therefore, a non-contact power feeding device according to one or more embodiments is disclosed that may be capable of making a voltage across terminals of a resonance capacitor included in a power receiver-side resonance circuit lower.

Provided according to one or more embodiments is a non-contact power feeding device including a power transmitter device and a power receiver device to which the power transmitter device transmits power in a non-contact manner. In the non-contact power feeding device, the power transmitter device includes a transmitter coil configured to supply power to the power receiver device, and a power supply circuit configured to supply AC power to the transmitter coil. The power receiver device includes a plurality of resonance circuits configured to receive power from the transmitter coil of the power transmitter device, and a power receiver circuit configured to output, to a load circuit, the power received from the power transmitter device by the plurality of resonance circuits, each of the plurality of resonance circuits includes a receiver coil configured to receive power from the power transmitter device, and a resonance capacitor configured to resonate, together with the receiver coil, with the AC power supplied to the transmitter coil, and the receiver coils of the plurality of resonance circuits are arranged so as to be electromagnetically coupled to each other.

Such a structure may allow the non-contact power feeding device according to one or more embodiments to make a voltage across terminals of the resonance capacitor included in the power receiver-side resonance circuit lower.

In the non-contact power feeding device, the receiver coils of the plurality of resonance circuits are wound around a single core.

This allows the power receiver device of the non-contact power feeding device to efficiently take power received by each resonance circuit via one resonance circuit or a load coil provided so as to be electromagnetically coupled to each resonance circuit.

Further, in the non-contact power feeding device, the receiver coils of the plurality of resonance circuits may be identical in inductance to each other.

Accordingly, in order to cause each resonance circuit to resonate with the AC power supplied to the transmitter coil, the resonance capacitors of the resonance circuits are made approximately identical in capacitance to each other, thereby allowing the power receiver device of the non-contact power feeding device to make the voltage across the terminals of the resonance capacitor included in each resonance circuit lower to the same extent.

DETAILED DESCRIPTION

Hereinafter, a non-contact power feeding device according to one or more embodiments will be described with reference to the drawings. In this non-contact power feeding device, a power receiver-side device (hereinafter, simply referred to as a power receiver device) includes a plurality of resonance circuits that resonate with a current flowing through a transmitter coil of a power transmitter-side device (hereinafter, simply referred to as a power transmitter device). Receiver coils of the resonance circuits are arranged so as to be electromagnetically coupled to each other, and the power receiver device outputs, from one of the resonance circuits, power received by each resonance circuit. Such a structure causes, as compared with a structure where the power receiver device includes one resonance circuit and one receiver coil, the non-contact power feeding device to make inductance of the receiver coil of each resonance circuit lower and make capacitance of a resonance capacitor higher, the resonance capacitor and the receiver coil making up each resonance circuit, so as to make a voltage across terminals of the resonance capacitor included in each resonance circuit lower. Further, causing the receiver coils of the resonance circuits to be arranged so as to be electromagnetically coupled to each other allows the non-contact power feeding device to take, from one of the resonance circuits, power received by each resonance circuit, thereby making it possible to suppress a decrease in power transmission efficiency.

Figure 1:
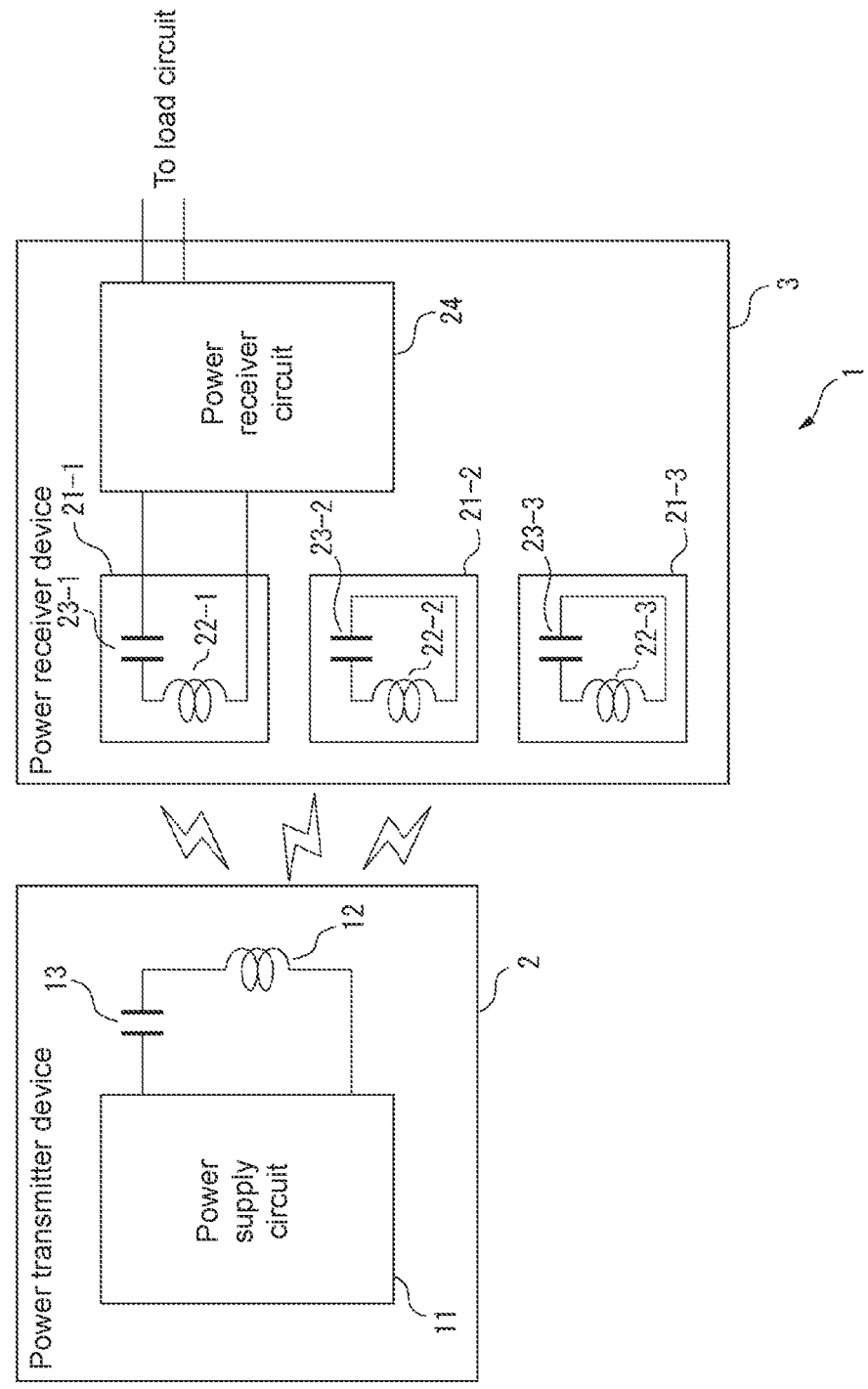
FIG. 1 is a diagram illustrating a schematic structure of a non-contact power feeding device according to one or more embodiments.

FIG. 1 is a schematic structure diagram of the noncontact power supply apparatus according to one or more embodiments. As shown in FIG. 1, the non-contact power feeding device 1 includes a power transmitter device 2 and a power receiver device 3 to which the power transmitter device 2 transmits power across space in a non-contact manner. The power transmitter device 2 includes a power supply circuit 11, a transmitter coil 12, and a capacitor 13. On the other hand, the power receiver device 3 includes n resonance circuits 21-1 to 21-n (where n is an integer greater than or equal to 2, and in the example shown in FIG. 1, n is equal to 3) and a power receiver circuit 24. According to one or more embodiments, the non-contact power feeding device 1 is of a type in which the receiver coil and the resonance capacitor resonate in series on the secondary side without using resonance on the primary side (NS type). Note that the non-contact power feeding device 1 may be of a primary series, secondary series resonance capacitor type (SS type), a primary series, secondary parallel resonance capacitor type (SP type), or a type in which the receiver coil and the resonance capacitor resonate in parallel on the secondary side without using resonance on the primary side (NP type).

First, a description will be given of the power transmitter device 2.

The power supply circuit 11 supplies AC power to the transmitter coil 12. It is therefore required that the power supply circuit 11 include, for example, a DC power supply that supplies DC power, an inverter circuit that converts the DC power supplied from the DC power supply to AC power and supplies the AC power to the transmitter coil 12, and a control circuit that controls the inverter circuit. The inverter circuit may be a full-bridge inverter having four switching elements (for example, MOSFETs) connected in a full-bridge configuration, or may be a half-bridge inverter having two switching elements connected in a half-bridge configuration. The control circuit controls switching of each switching element of the inverter circuit to an on or off state to make a frequency of the AC power supplied to the transmitter coil 12 equal to a predetermined frequency (for example, a resonance frequency of each resonance circuit of the power receiver device 3). The power supply circuit 11 may further include a DC-DC converter between the DC power supply and the inverter circuit. Alternatively, instead of the DC power supply, the power supply circuit 11 may include a rectifying circuit that is connected to an AC power supply and rectifies AC power from the AC power supply, and a power factor correction circuit that is connected to the rectifying circuit and converts pulsating power output from the rectifying circuit to DC power. In such a structure, the control circuit may control, in order to keep the voltage of the power output from the power receiver device 3 to the load circuit constant, the power factor correction circuit to adjust the voltage of the DC power supplied to the inverter circuit, for example.

The transmitter coil 12 is electromagnetically coupled to the receiver coil of each resonance circuit of the power receiver device 3 to transmit the AC power supplied from the power supply circuit 11 to the resonance circuits 21-1 to 21-n of the power receiver device 3 across space.

The capacitor 13 is connected in series to the transmitter coil 12 between the transmitter coil 12 and the inverter circuit of the power supply circuit 11. According to one or more embodiments, the capacitor 13 is provided to cut off DC power. It is therefore required that the capacitance of the capacitor 13 be set to prevent a resonance circuit made up of the transmitter coil 12 and the capacitor 13 from resonating with the AC power supplied to the transmitter coil 12, that is, to make the frequency of the AC power supplied to the transmitter coil 12 different from the resonance frequency of the resonance circuit. Note that when the power supply circuit 11 includes a full-bridge inverter, the capacitor 13 need not be provided.

Further, when the non-contact power feeding device 1 is of an SS or SP type, the capacitance of the capacitor 13 may be set so as to make the frequency of the AC power supplied to the transmitter coil 12 equal to the resonance frequency of the resonance circuit made up of the transmitter coil 12 and the capacitor 13.

Note that the power transmitter device 2 may further include a communicator that receives a signal representing a power receiving state of the power receiver device 3. This allows the control circuit of the power supply circuit 11 to change the timing of the switching of each switching element of the inverter circuit to the on or off state so as to change the frequency of the AC power supplied to the transmitter coil 12 in accordance with to the power receiving state.

Next, a description will be given of the power receiver device 3.

Each of the n resonance circuits 21-1 to 21-*n* includes a receiver coil 22-*k* and a resonance capacitor 23-*k* (k is in a range of 1 to n). According to one or more embodiments, in the resonance circuit 21-1, the receiver coil 22-1 and the resonance capacitor 23-1 are connected in series. The resonance circuit 21-1 is connected to the power receiver circuit 24. On the other hand, in the other resonance circuits 21-2 to 21-*n*, the receiver coil 22-*j* and the resonance capacitor 23-*j* (j is in a range of 2 to n) form a closed loop. Inductance of the receiver coil 22-*k* and capacitance of the resonance capacitor 23-*k* of each resonance circuit are set so as to make the resonance circuits 21-1 to 21-*n* identical in resonance frequency to each other and to cause each resonance circuit to resonate with the current flowing through the transmitter coil 12. Further, the receiver coils 22-*k* of the resonance circuits are arranged so as to be electromagnetically coupled to each other. Therefore, when the power transmitter device 2 and the power receiver device 3 are in a positional relationship where power transmission from the power transmitter device 2 to the power receiver device 3 is enabled, each of the receiver coils 22-1 to 22-*n* of the resonance circuits 21-1 to 21-*n* is electromagnetically coupled to the transmitter coil 12 to allow each resonance circuit to receive power from the transmitter coil 12. Furthermore, since the receiver coils 22-1 to 22-*n* of the resonance circuits 21-1 to 21-*n* are arranged so as to be electromagnetically coupled to each other, the resonance circuit 21-1 connected to the power receiver circuit 24 further receives power from the other resonance circuits 21-2 to 21-*n*. Therefore, the resonance circuit 21-1 outputs, to the power receiver circuit 24, the sum of power directly received from the power transmitter device 2 and power received from the power transmitter device 2 by the other resonance circuits 21-2 to 21-*n* and passed to the resonance circuit 21-1.

Note that the receiver coils 22-*k* of the resonance circuits and the transmitter coil 12 may be the same or different in number of turns. Further, the receiver coils 22-*k* of the resonance circuits may be the same or different in number of turns.

The power receiver circuit 24 converts AC power from the resonance circuit 21-1 to DC power and outputs the DC power to the load circuit (not shown) connected to the power receiver circuit 24. It is therefore required that the power receiver circuit 24 include, for example, a full-wave rectifying circuit that converts the AC power from the resonance circuit 21-1 to pulsating power, and a smoothing capacitor that smooths the pulsating power output from the full-wave rectifying circuit and outputs the power thus smoothed to the load circuit. The power receiver circuit 24 may further include a voltmeter for use in measuring a voltage output to the load circuit, a communicator for use in transmitting, to the power transmitter device 2, the signal representing the power receiving state such as a voltage measured by the voltmeter, a switching element for use in switching from connection to disconnection, and vice versa between the load circuit and the power receiver circuit 24, a control circuit that controls switching of the switching element to the on or off state, and the like.

Figure 2A:
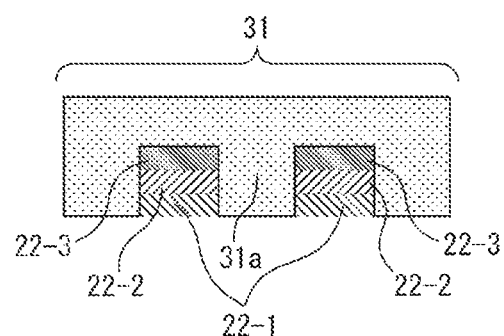
FIG. 2A is a diagram illustrating a schematic cross-sectional view of receiver coils included in resonance circuits of a power receiver device taken along a plane extending along center axes of the receiver coils, showing an example of an arrangement of receiver coils.
Figure 2A:
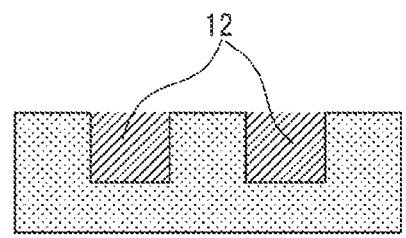
Figure 2B:
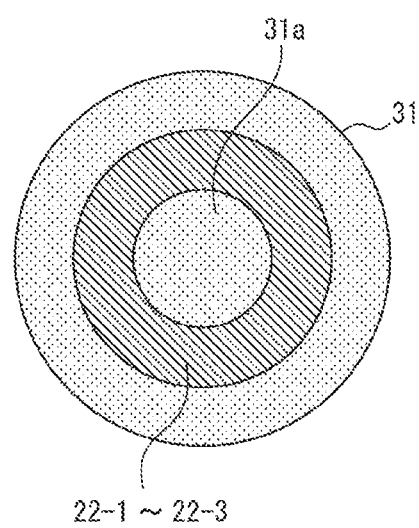
FIG. 2B is a diagram illustrating a schematic plan view of an example of an arrangement of receiver coils as viewed from a transmitter coil with power transmission between a power transmitter device and a power receiver device enabled.

FIG. 2A is a schematic cross-sectional view of each of the receiver coils 22-1 to 22-*n* (in this example, n is equal to 3) included in the resonance circuits 21-1 to 21-*n* of the power receiver device 3 taken along a plane extending along center axes of the receiver coils 22-1 to 22-*n*, showing an example of the arrangement of the receiver coils 22-1 to 22-*n*. FIG. 2B is a schematic plan view of the example of the arrangement of the receiver coils as viewed from the transmitter coil 12 with power transmission between the power transmitter device 2 and the power receiver device 3 enabled.

As shown in FIG. 2A, according to one or more embodiments, the receiver coils 22-1 to 22-3 of the resonance circuits are wound around a single core 31 so as to be electromagnetically coupled to each other. In particular, according to one or more embodiments, the receiver coils 22-1 to 22-3 are wound so as to be layered on a magnetic core 31*a* of the core 31. In the example shown in FIG. 2A, the receiver coils are layered in the order of the receiver coil 22-3, the receiver coil 22-2, and the receiver coil 22-1 from a side remote from the transmitter coil 12. Note that the receiver coils 22-1 to 22-3 may be layered in any order. This allows, when the transmitter coil 12 is placed to face the side of the core 31 around which the receiver coils 22-1 to 22-3 are wound, any of the receiver coils 22-1 to 22-3 to be electromagnetically coupled to the transmitter coil 12. Further, since the receiver coils 22-1 to 22-3 are wound around the single core 31, the degree of coupling between the receiver coils 22-1 to 22-3 may be made higher. This allows the resonance circuit 21-1 to receive the power from the power transmitter device 2 via the other resonance circuits 21-2 to 21-3 with high efficiency.

Figure 3A:
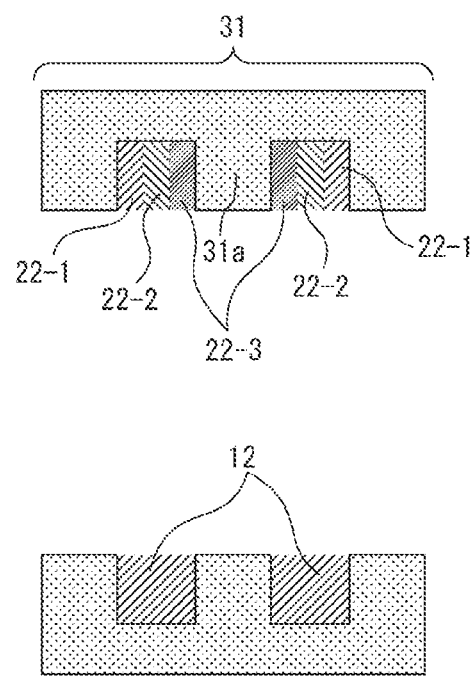
FIG. 3A is a diagram illustrating a schematic cross-sectional view of receiver coils included in resonance circuits of a power receiver device taken along a plane extending along the center axes of the receiver coils, showing another example of an arrangement of receiver coils.
Figure 3B:
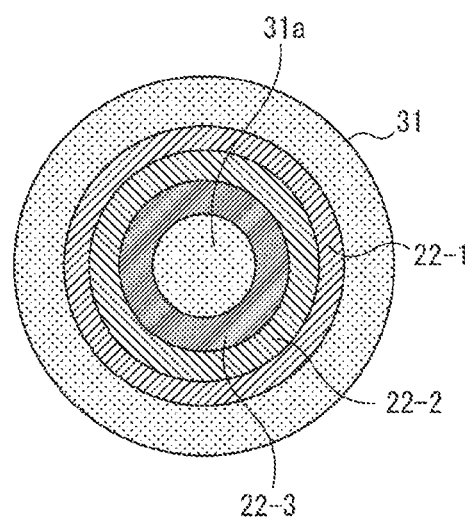
FIG. 3B is a diagram illustrating a schematic plan view of another example of an arrangement of receiver coils as viewed from a transmitter coil with power transmission between a power transmitter device and a power receiver device enabled.

FIG. 3A is a schematic cross-sectional view of each of the receiver coils 22-1 to 22-*n* (in this example, n is equal to 3) included in the resonance circuits 21-1 to 21-*n* of the power receiver device 3 taken along a plane extending along the center axes of the receiver coils 22-1 to 22-*n*, showing another example of the arrangement of the receiver coils 22-1 to 22-*n*. FIG. 3B is a schematic plan view of another example of the arrangement of the receiver coils as viewed from the transmitter coil 12 with power transmission between the power transmitter device 2 and the power receiver device 3 enabled.

Also, in this example, the receiver coils 22-1 to 22-3 of the resonance circuits are wound around the single core 31 as shown in FIG. 3A. In this example, however, the receiver coils 22-1 to 22-3 are wound concentrically around the magnetic core 31*a* of the core 31. In the example shown in FIG. 3A, the receiver coils are wound around the magnetic core 31*a* in the order of the receiver coil 22-3, the receiver coil 22-2, and the receiver coil 22-1 from the inner side. Note that the receiver coils 22-1 to 22-3 may be wound around the magnetic core 31*a* in any order. This example can make a difference in degree of coupling between each of the receiver coils 22-1 to 22-3 and the transmitter coil 12 smaller.

Figure 4A:
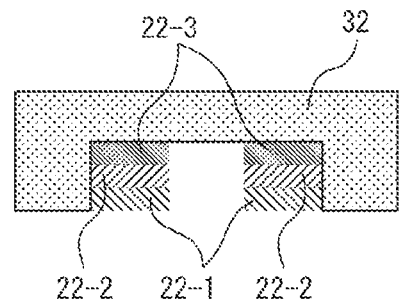
FIG. 4A is a diagram illustrating a schematic cross-sectional view of receiver coils included in resonance circuits of a power receiver device taken along a plane extending along the center axes of the receiver coils, showing yet another example of an arrangement of receiver coils.
Figure 4B:
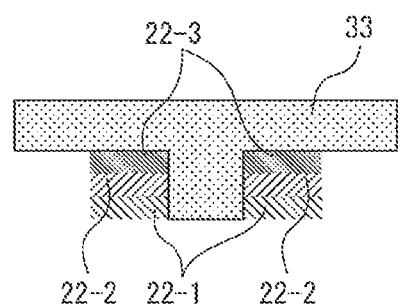
FIG. 4B is a diagram illustrating a schematic cross-sectional view of receiver coils included in resonance circuits of a power receiver device taken along a plane extending along the center axes of the receiver coils, showing yet another example of an arrangement of receiver coils.
Figure 4C:
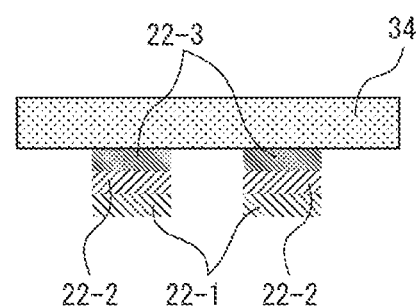
FIG. 4C is a diagram illustrating a schematic cross-sectional view of receiver coils included in resonance circuits of a power receiver device taken along a plane extending along the center axes of the receiver coils, showing yet another example of an arrangement of receiver coils.
Figure 4D:
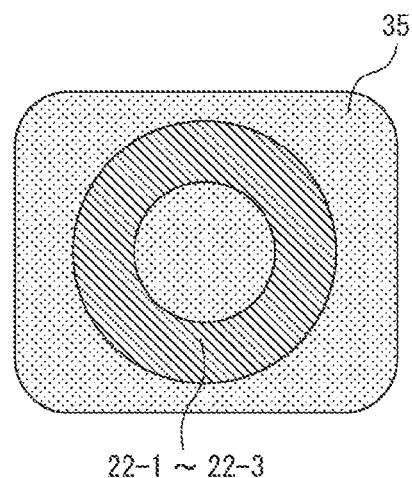
FIG. 4D is a diagram illustrating a schematic plan view of receiver coils, showing yet another example of an arrangement of receiver coils as viewed from a transmitter coil with power transmission between a power transmitter device and a power receiver device enabled.

FIGS. 4A to 4C are schematic cross-sectional views of each of the receiver coils 22-1 to 22-*n* (in this example, n is equal to 3) included in the resonance circuits 21-1 to 21-*n* of the power receiver device 3 taken along a plane extending along the center axes of the receiver coils 22-1 to 22-*n*, showing yet another example of the arrangement of the receiver coils 22-1 to 22-*n*. FIG. 4D is a schematic plan view of the receiver coils, showing yet another example of the arrangement of the receiver coils as viewed from the transmitter coil 12 with power transmission between the power transmitter device 2 and the power receiver device 3 enabled.

In any of the examples shown in FIGS. 4A to 4C, the receiver coils 22-1 to 22-3 are wound around a single core 32. Note that, in the example shown in FIG. 4A, the core 32 has no magnetic core. Further, in the example shown in FIG. 4B, a core 33 is a core having a projection but without a cover that surrounds each receiver coil. Furthermore, in the example shown in FIG. 4C, a core 34 is a flat core.

Furthermore, as shown in FIG. 4D, the receiver coils 22-1 to 22-3 may be wound around a core 35 having an approximately rectangular outer shape. Note that the core 35 may be a pot core, or may be a core having a projection or a flat core. Note that, in the examples shown in FIGS. 4A to 4D, the receiver coils 22-1 to 22-3 are layered as in the example shown in FIG. 2A, but the receiver coils 22-1 to 22-3 may be arranged concentrically around the same center axis as in the example shown in FIG. 3A.

A description will be given below of a reduction in voltage across the terminals of the resonance capacitor included in each resonance circuit due to the presence of the plurality of resonance circuits in the power receiver device 3 according to the embodiment.

A voltage across terminals of a resonance capacitor of an RLC series resonance circuit, denoted by Vpp, is given by the following equation.

[Math. 1]

$$Vpp = 2\sqrt{2}\,\frac{I_{cs}}{2\pi f C_s} \tag{1}$$

Herein, Ics denotes a value of an effective current flowing through the resonance capacitor, and Cs denotes the capacitance of the resonance capacitor. Further, f denotes a resonance frequency of the resonance circuit. As is apparent from the equation (1), the larger the capacitance Cs of the resonance capacitor, the smaller the voltage Vpp across the terminals of the resonance capacitor.

On the other hand, when the resonance frequency f of the resonance circuit is made constant, the smaller the inductance L of the receiver coil, the larger the capacitance Cs of the resonance capacitor.

Further, the inductance L of the coil is proportional to the square of the number of turns N of the coil. Therefore, when a structure where the power receiver device includes a single resonance circuit is compared with a structure where the receiver coil included in the single resonance circuit is divided into a plurality of partial coils to form a plurality of resonance circuits each including a corresponding one of the partial coils, the capacitance of the resonance capacitor of each resonance circuit including the partial coil is larger than the capacitance of the resonance capacitor of the original single resonance circuit. Note that, since the receiver coils of the resonance circuits are electromagnetically coupled to each other by a predetermined degree of coupling, in order to make the output voltage identical, the resonance frequency of each resonance circuit in the structure where the plurality of resonance circuits are provided is different from the frequency of the resonance circuit in the structure where the single resonance circuit is provided. For example, as in the above-described embodiment, when the power receiver device 3 includes three resonance circuits, and their respective receiver coils have the same number of turns, the inductance of the receiver coil of each resonance circuit is one ninth of the inductance of the receiver coil of the original single resonance circuit. Therefore, in order to obtain the same output voltage as the output voltage in the structure where the single resonance circuit is provided, the capacitance of the resonance capacitor of each resonance circuit including the partial coil becomes larger than the capacitance of the resonance capacitor of the original single resonance circuit, and the equation (1) shows that the voltage Vpp across the terminals of the resonance capacitor becomes lower.

Further, the receiver coils 22-1 to 22-$n$ of the resonance circuits 21-1 to 21-$n$ included in the power receiver device 3 may be different in inductance from each other, but it may be preferable that they are identical in inductance to each other. As a result, in order to make the resonance circuits 21-1 to 21-$n$ identical in resonance frequency to each other, the resonance capacitors 23-1 to 23-$n$ of the resonance circuits 21-1 to 21-$n$ are also identical in capacitance to each other, thereby allowing the power receiver device 3 to make the voltage across the terminals of the resonance capacitor included in each resonance circuit lower to the same extent.

Further, in the power receiver device 3 according to one or more embodiments, since the receiver coils 22-1 to 22-$n$ of the resonance circuits 21-1 to 21-$n$ are provided so as to be electromagnetically coupled to each other, the resonance circuit 21-1 connected to the power receiver circuit 24 among the resonance circuits may take not only power directly received from the power transmitter device 2 but also power received from the power transmitter device 2 by the other resonance circuits 21-2 to 21-$n$.

A description will be given below of an example of calculation of the voltage across both the terminals of the resonance capacitor of the resonance circuit for the power receiver device including a single resonance circuit, which is a comparative example, and the power receiver device 3 according to one or more embodiments. Note that it is assumed that the power receiver device 3 includes three resonance circuits.

In the comparative example, it is assumed that a voltage Vin of AC power applied to the transmitter coil 12 is 270 V, a frequency f of the AC power is 85 kHz, inductance L1 of the transmitter coil 12 is 216 µH, and capacitance of the capacitor 13 is 1.7 µF. It is further assumed that inductance L2 of the receiver coil of the resonance circuit of the power receiver device is 216 µH, capacitance Cs of the resonance capacitor connected in series to the receiver coil is 16.5 nF, a degree of coupling k between the transmitter coil and the receiver coil is 0.15, a resistance value RI of the resonance circuit made up of the transmitter coil 12 and the capacitor 13 of the power transmitter device is 0.12Ω, a resistance value Ro of the resonance circuit of the power receiver device is 0.12Ω, a resistance value of the load circuit is 6.5Ω, and a voltage Vo output to the load circuit is 40 V. In this case, the voltage Vpp across the terminals of the resonance capacitor becomes equal to 1780 V according to the equation (1). On the other hand, it is assumed that three coils that result from equally dividing the receiver coil of the comparative example are the receiver coils 22-1 to 22-3 included in the resonance circuits 21-1 to 21-3 of the power receiver device 3 of one or more embodiments. Then, the inductance L2 of the receiver coil of each resonance circuit of the power receiver device 3 is set to 24 µH, and the capacitance of the resonance capacitor is set to 56 nF, so that the resonance circuits of the power receiver device 3 resonate at the same frequency, and the output voltage Vo is equal to the output voltage of the comparative example. When it is assumed that the degree of coupling between the receiver coils of the resonance circuits of the power receiver device is 0.83, and the other parameter values are the same as the parameter values of the above-described comparative example, the voltage Vpp across the terminals of the resonance capacitor becomes equal to 521.5 V according to the equation (1). As described above, in the non-contact power feeding device according to one or more embodiments, the voltage across the terminals of the resonance capacitor of the resonance circuit becomes lower.

As described above, the power receiver device of the non-contact power feeding device includes the plurality of resonance circuits that can resonate with the current flowing through the transmitter coil of the power transmitter device, and the receiver coils of the plurality of resonance circuits are arranged so as to be electromagnetically coupled to each other. This allows the non-contact power feeding device to make the inductance of the receiver coil of each resonance circuit low as compared with the structure where the power receiver device includes the single resonance circuit, so that the capacitance of the resonance capacitor of each resonance circuit can be made larger to make the voltage across the terminals of the resonance capacitor included in each resonance circuit lower. Further, in the non-contact power feeding device, since the receiver coils included in the plurality of resonance circuits are arranged so as to be electromagnetically coupled to each other, which allows one of the plurality of resonance circuit to take power received by each of the resonance circuits. This allows the non-contact power feeding device to suppress a decrease in power transmission efficiency while making the voltage across the terminals of the resonance capacitor included in each resonance circuit of the power receiver device lower.

According to a modification, among the resonance circuits 21-1 to 21-n included in the power receiver device 3, in the resonance circuit 21-1 connected to the power receiver circuit 24, the receiver coil 22-1 and the resonance capacitor 23-1 may be connected in parallel. In a parallel resonance circuit, the lower the inductance of the receiver coil 22-1, the higher the Q factor representing the sharpness of resonance. Therefore, when the resonance circuit 21-1 is a parallel resonance circuit, the power receiver device 3 can easily output a high voltage to the load circuit as compared with the structure where the resonance circuit 21-1 is a series resonance circuit.

According to another modification, the power receiver device may further include a load coil provided so as to be electromagnetically coupled to each of the receiver coils of the plurality of resonance circuits, and the load coil may be connected to the power receiver circuit. In this structure, the load coil may be wound around a single core together with the receiver coil of each resonance circuit. For example, the load coil may be wound around the magnetic core of the core 31 shown in FIGS. 2A and 3A together with the receiver coil of each resonance circuit. At this time, the receiver coil of each resonance circuit may be wound concentrically around the magnetic core, while the load coil may be disposed remote from the transmitter coil relative to the receiver coil of each resonance circuit, that is, may be disposed on an upper side of each receiver coil in FIG. 3A, when the power transmitter device and the power receiver device are arranged to enable power transmission. This prevents the degree of coupling between each receiver coil and the transmitter coil from decreasing due to the presence of the load coil.

In this case, the power received by each resonance circuit is output from the load coil to the load circuit via the power receiver circuit 24. This also allows, as in the above-described embodiment, the power receiver device to suppress a decrease in power transmission efficiency while making the voltage across the terminals of the resonance capacitor included in each resonance circuit lower.

As described above, those skilled in the art may make various modifications according to one or more embodiments within the scope.

DESCRIPTION OF SYMBOLS 1 non-contact power feeding device
2 power transmitter device
11 power supply circuit
12 transmitter coil
13 capacitor
3 power receiver device
21-1 to 21-n resonance circuit
22-1 to 22-n receiver coil
23-1 to 23-n resonance capacitor
24 power receiver circuit
31 to 35 core

The invention claimed is:

1. A non-contact power feeding device comprising:
a power transmitter device; and
a power receiver device to which the power transmitter device transmits power in a non-contact manner, wherein
the power transmitter device comprises:
   a transmitter coil configured to supply power to the power receiver device;
and
   a power supply circuit configured to supply AC power to the transmitter coil,
the power receiver device comprises:
   a plurality of resonance circuits configured to receive power from the transmitter coil of the power transmitter device; and
   a power receiver circuit configured to output, to a load circuit, the power received from the power transmitter device by the plurality of resonance circuits, each of the plurality of resonance circuits comprises:
   a receiver coil configured to receive power from the power transmitter device, and a resonance capacitor configured to resonate, together with the receiver coil, with the AC power supplied to the transmitter coil; and
   the receiver coils of the plurality of resonance circuits are arranged so as to be electromagnetically coupled to each other, and
a first resonance circuit among the plurality of resonance circuits is connected to the power receiver circuit, the receiver coil and the resonance capacitor of the first resonance circuit are connected in parallel, and the receiver coil and the resonance capacitor of each resonance circuit other than the first resonance circuit among the plurality of resonance circuits, are connected in series.

2. The non-contact power feeding device according to claim 1, wherein
the receiver coils of the plurality of resonance circuits are wound around a single core.

3. The non-contact power feeding device according to claim 2, wherein
the receiver coils of the plurality of resonance circuits are identical in inductance to each other.

4. The non-contact power feeding device according to claim 1, wherein
the receiver coils of the plurality of resonance circuits are identical in inductance to each other.

* * * * *